United States Patent [19]

Moriyama et al.

[11] 4,225,905
[45] Sep. 30, 1980

[54] FLUORESCENT LIGHT FIXTURE

[75] Inventors: Hideo Moriyama; Masayuki Katoogi, both of Tokyo, Japan

[73] Assignee: Moriyama Sangyo Kabushiki Kaisha, Tokyo, Japan

[21] Appl. No.: 902,421

[22] Filed: May 3, 1978

[30] Foreign Application Priority Data

| May 9, 1977 | [JP] | Japan | 52-53569 |
| May 28, 1977 | [JP] | Japan | 52-62684 |
| Jun. 27, 1977 | [JP] | Japan | 52-76338 |
| Mar. 1, 1978 | [JP] | Japan | 53-23166 |
| Mar. 1, 1978 | [JP] | Japan | 53-23167 |

[51] Int. Cl.² ............................................. F21S 5/00
[52] U.S. Cl. ................................. 362/216; 362/225
[58] Field of Search ............... 362/216, 225, 227, 234

[56] References Cited

U.S. PATENT DOCUMENTS

| 1,820,027 | 8/1931 | McClintock . | |
| 1,976,647 | 10/1934 | Wilkinson | 362/216 |
| 2,309,676 | 2/1943 | Schmidling | 362/216 |
| 2,494,058 | 1/1950 | Ries et al. | 362/216 |
| 2,817,004 | 12/1957 | Baumgartner et al. | 362/216 |
| 2,878,372 | 3/1959 | Fry | 362/216 |
| 2,943,238 | 6/1960 | Reaves | 362/216 |
| 2,963,574 | 12/1960 | Pfaff | 362/216 |
| 3,184,585 | 5/1965 | Rouy | 362/216 |
| 3,185,836 | 5/1965 | Flaugher et al. | 362/216 |
| 3,591,792 | 11/1968 | Soltan | 362/216 |
| 3,611,009 | 10/1971 | McNeil . | |
| 4,005,330 | 1/1977 | Glascock et al. . | |
| 4,109,303 | 8/1978 | Hetherington | 362/216 |

FOREIGN PATENT DOCUMENTS

| 960129 | 6/1964 | United Kingdom | 362/216 |
| 1025684 | 4/1966 | United Kingdom | 362/216 |
| 1029279 | 5/1966 | United Kingdom | 362/216 |

Primary Examiner—Monroe H. Hayes
Attorney, Agent, or Firm—Spencer & Kaye

[57] ABSTRACT

A fluorescent light fixture having a cover assembly and base for insertion into an incandescent lamp socket. The cover assembly consists of two cover members, one of which is detachable for replacement of a fluorescent lamp supported within the cover assembly or for exchange of one of the cover members.

18 Claims, 39 Drawing Figures

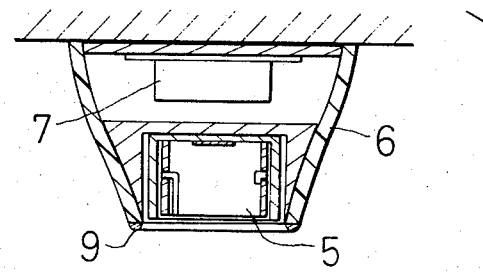
FIG.1
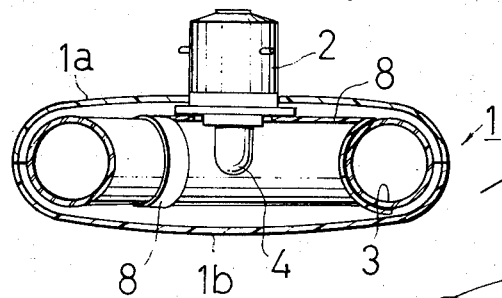
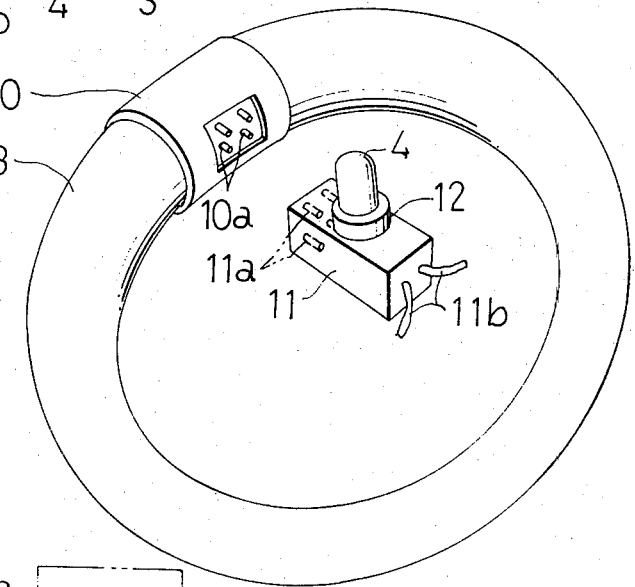
FIG.2
FIG.3
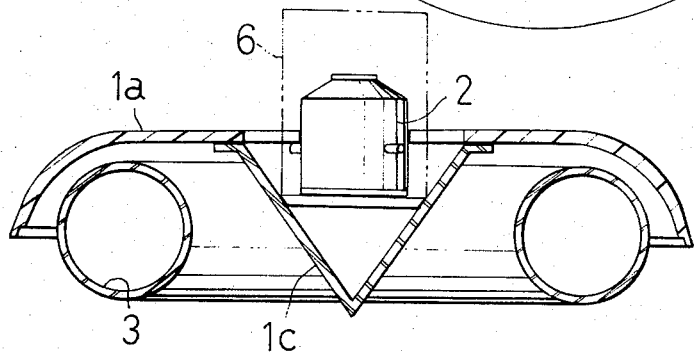

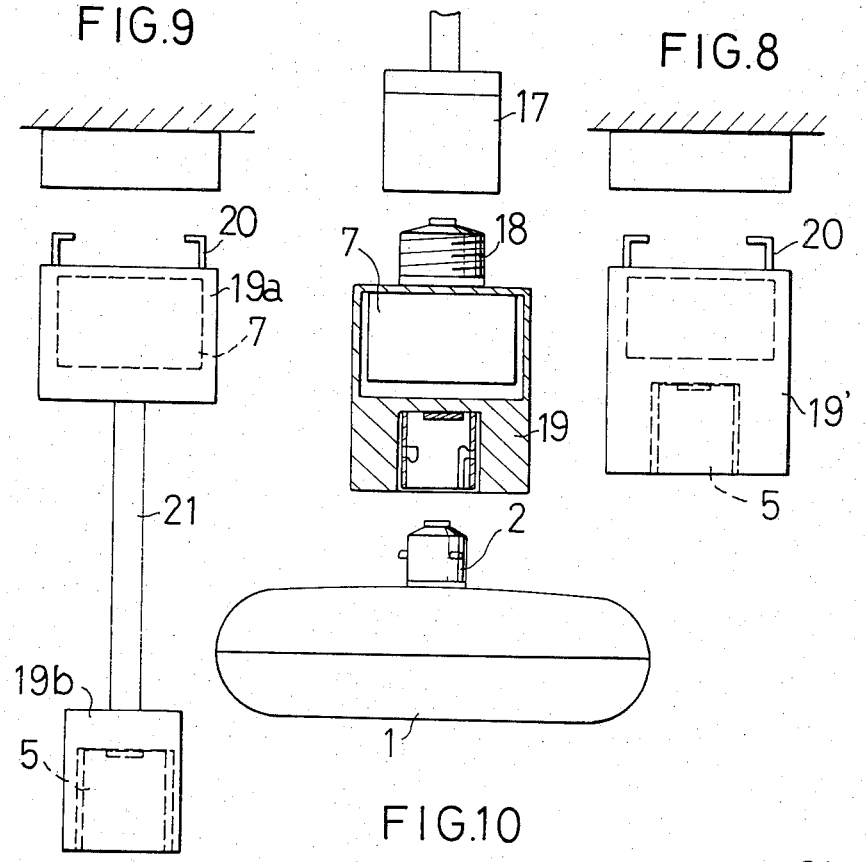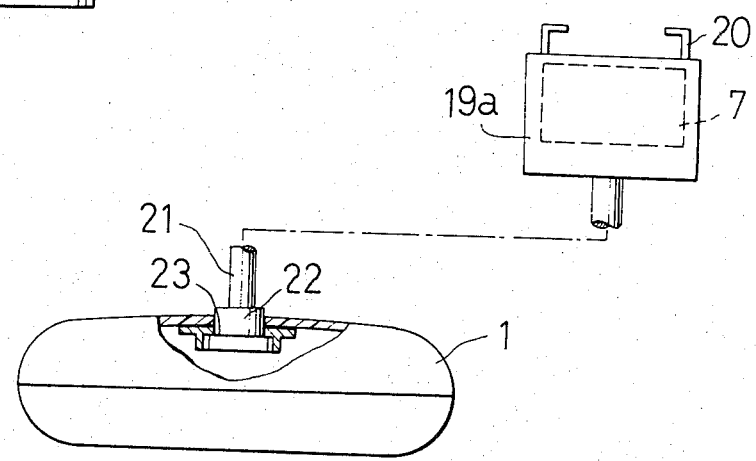

FLUORESCENT LIGHT FIXTURE

The present invention relates to a fluorescent light fixture adapted to be screwed or fitted into a conventional incandescent lamp socket. More particularly, it relates to a light fixture which uses as a light source presently marketed fluorescent discharge tubes.

A fluorescent designed light fixture particularly for household use is usually a large cover is provided over a fluorescent light tube and a lighting control means such as a stabilizer. Such a large cover gives the fixture a completely different appearance than that of an ordinary incandescent lamp. Also, such a fluorescent lamp can not be directly connected to an incandescent lamp socket, such as a socket fixed to the ceiling of a room.

If the fluorescent lamp could be fitted into the ordinary incandescent lamp socket, it would be advantageous in that its efficiency use of energy would be efficient as, compared with that of an incandescent lamp. Also, it would provide a special illumination effect, which is different from that provided by an incandescent lamp.

For the above purpose, a fluorescent light fixture has been developed and marketed, wherein a lighting stabilizer is positioned within the central clearance of a circular fluorescent lamp and both the stabilizer and lamp are supported by a common support means having a base. Since this conventional fluorescent light fixture consists only of a structure which fixes the fluorescent lighting means to the base means, the fluorescent lamp itself is bare, as in the case of the ordinary fluorescent lamp structure.

In U.S. Pat. Nos. 3,611,009, and 4,005,330, it is proposed to use a fluorescent lamp whose envelope has a special shape and which has a base means. In view of the peculiar shape of envelope of the such a lamp, several difficulties have been encountered in its manufacture.

In U.S. Pat. No. 1,820,027, there is disclosed a fluorescent lamp member adapted to be fitted to an ordinary incandescent lamp socket, using a fluorescent lamp having a bent envelope and a globe covering a peculiarly shaped fluorescent lamp. Although the appearance of this fluorescent lamp structure is of an ordinary incandescent lamp, the shape of the fluorescent envelope itself is peculiar, and its manufacture is not easy.

In these conventionally developed fluorescent light fixtures, a further problem exists. When the cover means of the inner fluorescent lamp or other parts of the lamp is broken, the entire fixture has to be replaced. Therefore the remaining parts which could have been used for a long time, such as the lighting control circuit including the stabilizer are thrown away together with the broken parts.

The present invention has therefore for its object to provide a fluorescent light fixture which may be directly installed in a standard incandescent lamp socket and in which a fluorescent lamp and the initiator bulb may independently be replaced.

Briefly stated, the fluorescent light fixture of this invention comprises a base to be connected with an incandescent lamp socket to which the electricity is supplied, a cover assembly connected to the base having a space therewithin, the cover assembly having at least two covers so that one of the two covers may be removable or exchangeable, a part or whole of the cover assembly being translucent, a fluorescent tube of a hot cathode low pressure mercury vapor discharge tube received within the space of the cover assembly, which has a base and an inner wall which is coated with fluorescent material, a support construction which removably supports the fluorescent tube within the cover assembly, and an electric circuit including lighting means which connects the base of the cover assembly with the base of the fluorescent tube.

Other objects and advantages of this invention will be made more apparent in the detailed description of the preferred embodiments presented below. In the detailed description of the invention, reference is made to the accompanying drawings, in which:

FIG. 1 is a side view, in section, of an embodiment of a fluorescent light fixture of the present invention, wherein an initiator bulb is included within the cover assembly;

FIG. 2 shows the relation of connection of a circular fluorescent tube with the initiator bulb;

FIG. 3 shows a modification of the embodiment of FIG. 1 wherein a part of the cover assembly constitutes a reflector;

FIGS. 7–9 show embodiments of the power supply sides of the light fixture of this invention;

FIG. 10 shows an example of the light fixture, wherein the cover assembly has an opening for a cord terminal;

In the drawings, the same reference numerals are used for indicating the same or similar parts throughout the figures.

Figure 4:
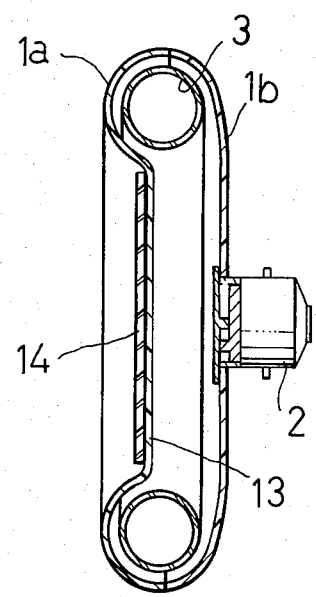
FIG. 4 shows an embodiment of the light fixture which illuminates a mirror.

In the embodiment shown in FIG. 1, a cover assembly 1 made of light transmitting transparent or translucent material such as a synthetic resin is constituted by a first cover 1a and a second cover 1b. In the center of the first cover 1a is integrally mounted a base member 2. Bases of any type may be used other than the illustrated base type. Within the cover assembly 1 are disposed a circular fluorescent lamp 3 and an initiator bulb 4 using a support member 8. In order to make the cover assembly 1 airtight, the contact faces of the covers 1a and 1b may be secured using screws projecting through packing material installed therebetween. On the other hand, the covers 1a and 1b may be secured not only by set screws, but also by any other attaching means, such as screwing means, hooks, etc. Thus the two covers are removable from each other, so that the lamp 3 or the initiator bulb 4 may be replaced. Also, the cover itself may be replaced with, for example, a colored cover. In such case, variety of combinations of the two covers may be employed.

The circular fluorescent lamp 3 and the initiator bulb 4 within the cover assembly 1 are electrically connected to the base 2 through a known initiator bulb circuit.

The light source structure as above constructed is put into a socket 5 of a support 6 which is directly attached to the ceiling. In the support 6 is contained a stabilizer 7 of a fluorescent lamp lighting control circuit. In this embodiment the stabilizer uses an inductance. But it should be understood that a resistor or transistor may be used in place of the inductance. The stabilizer 7 receives an input from the power source and outputs into terminals of the socket 5. When the base 2 of the light source structure is put into the socket 5, the fluorescent lamp 3 is lit.

By mounting an "O" ring 9 of rubber, etc. around a rim of the socket 5 of the support 6, moistureproofing is achieved between the contact faces of the socket 5 and the cover assembly 1 by the "O" ring interposed therebetween. Moistureproofing of the entire light fixture is thus achieved between the covers 1a and 1b and between the socket 5 and the cover assembly 1.

In order to simplify and increase the reliability of mounting and electric connection of the fluorescent light fixture of this invention, a socket assembly 11 has been developed, which is shown in FIG. 2. The socket assembly 11 in this embodiment is provided with receiving contact pieces 11a which receive electrode pins 10a provided in a base or connecting means 10 of the circular fluorescent lamp 3. A socket 12 for the initiator bulb 4 is integrally provided in the socket assembly 11. Input lines 11b electrically connected to the base 2 (FIG. 1) by brazing are connected through two of the contact pieces 11a to electrode pins 10a of both of the two poles of the lamp 3. On the other hand, the other electrode pins 10a of both poles of the lamp 3 are connected to two poles of the socket 12 through the other contact pieces 11a. Thus a circuit for the initiator bulb 4 to be put into the socket 12 is constituted within the socket assembly 11.

According to the light fixture of this invention, only the fluorescent lamp 3 and the initiator bulb 4 are disposed within the cover assembly 1, and therefore there is space in the center part of the fluorescent lamp 3 when using the illustrated circular lamp. In the embodiment of FIG. 3, a member 1c having the shape of an inverted cone is inserted into this space. In this embodiment, the outer surface of the member 1c facing downwardly is a mirror so that efficient light reflection over a wide range is obtained. The base 2 may be disposed in the rear space of the member 1c as is shown in the figure. When attached to the support 6 or to a socket of the receptacle type, the structure of this embodiment is incorporated therewith and gives a special illumination effect.

Figure 5:
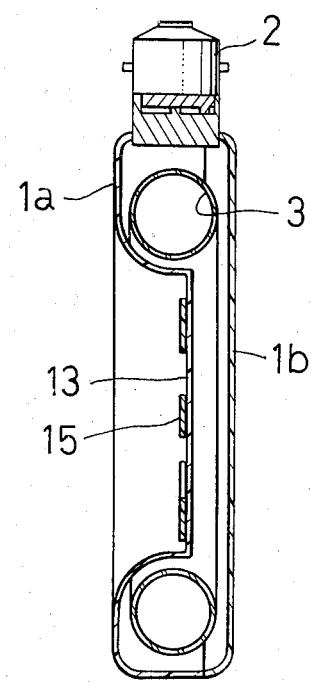
FIG. 5 shows a similar embodiment of FIG. 4 wherein an indication may be made.

In the embodiments of FIGS. 4 and 5, a reentrant portion 13 is provided in the cover assembly at the center of the circular lamp 3 and attached thereto. In FIG. 4, there is a mirror 14 for use as a make-up mirror or as an illumination light source. In the embodiment of FIG. 5, in which the base 2 is provided in a different position with reference to the cover assembly 1, that is, with its longitudinal axis parallel to the plane of the circular lamp an indication plate 15 is attached to the reentrant portion 13 for advertisement, etc. By applying letters, patterns, characters or figures on the indication plate 15, they may be illuminated either as a silhouette or directly illuminated. If light irradiation is required for the indication of the plate 15, a deeper reentrant portion 13 must be formed in the space within the circular lamp 3.

In the embodiments of FIGS. 4 and 5, excess play is provided between the cover assembly 1 and the base 2 so as to allow free rotation of about 180°. Thus the direction of the cover assembly 1, or the reentrant portion 13 may be selected with respect to the support 6. The structure providing this play will be explained later with reference to FIGS. 19 and 20.

Figure 6:
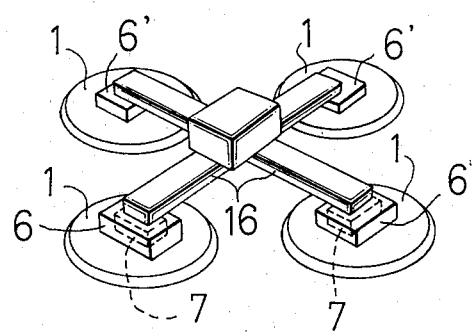
FIG. 6 shows an embodiment of the light fixture wherein a plurality of the fixtures are connected to a common single power source.

In the embodiment shown in FIG. 6, a conventional interior type wiring device is used. The wiring device has plural arms 16 and at each end thereof is provided the socket 5 (not shown). By disposing the stabilizer 7 in each of the socket 5, the lamp assemblies of this invention may be used.

In each of the embodiments of FIGS. 7-9, an intermediate device 19 is used between the conventional socket 5 and the cover assembly 1. In the intermediate device 19 in the embodiment of FIG. 7 which is connected to the conventional receptacle socket 17, a base 18 is provided at one end thereof for insertion into the socket 17.

At the other end of the device 19 is provided the socket 5 and the stabilizer 7 is disposed in the intermediate device 19. In this case, an input to the stabilizer 7 is connected with the base 18 and the output therefrom is connected to the socket 5.

In order to decrease the load to the base 18 when fitting it to the socket 17 and to prevent it from slipping from the socket, it is desirable to provide a mechanical support means. In the embodiment of FIG. 8, however, electrode pieces 20 used for the known hook sealing device have sufficient mechanical strength, and so the above mentioned mechanical support means is not required. In the intermediate device 19' of this embodiment, there is also included the stabilizer 7 therewithin.

In the embodiment of FIG. 9, the intermediate device is divided into a hook sealing member 19a including therein the stabilizer 7 and a socket assembly 19b having a socket 5, both being connected with a hanging cord 21 therebetween.

In the embodiment of FIG. 10, the lower end of the hanging cord 21 is treated by molding synthetic resin material to constitute integrally a cord end which is engaged with an opening 23 provided in the first cover 1a. In this embodiment the base 2 of the cover assembly 1 and the socket 5 of the intermediate device 19 are dispensed with, which gives much freedom in determining the shape of the cover assembly 1.

Figure 11:
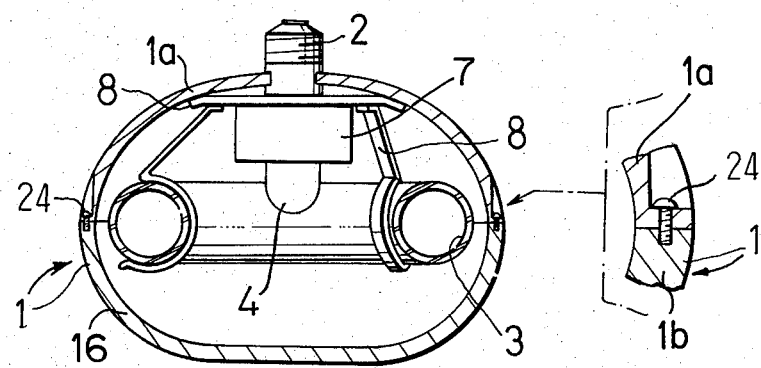
FIG. 11 shows an embodiment of the light fixture including a transformer, which is a stabilizer, within the cover assembly.

In FIG. 11, there is shown the light source structure having within the cover assembly 1 the stabilizer 7. In this embodiment, as explained with reference to FIG. 1, the first and second covers 1a and 1b are fixed by set screws 24 and the circular fluorescent lamp 3, the initiator bulb 4 and its lighting means, and the stabilizer 7 are supported by support members 8.

In the embodiment shown, the base 2 is mounted on the first cover 1a integrally therewith. Instead of this construction, the base 2 and the support members 8 or the lighting means are integrally formed so as to be mounted to the cover assembly 1. Also, the support member 8 may be formed integrally with the cover assembly 1.

Figure 12:
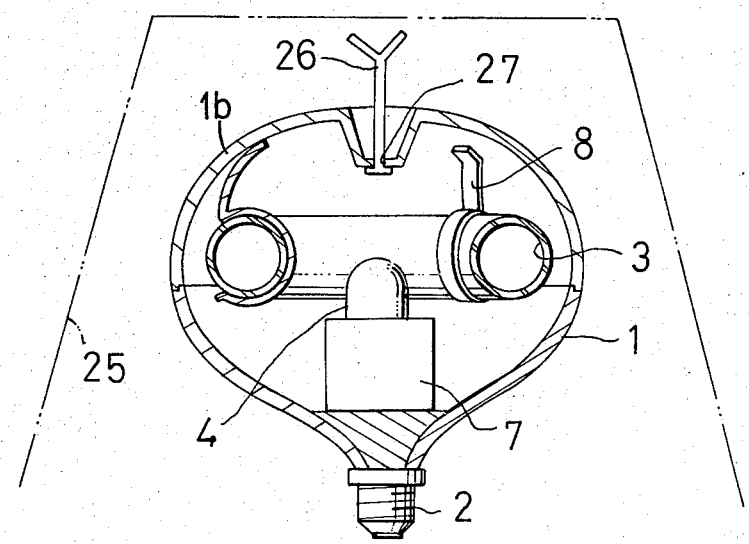
FIG. 12 shows a modification of the embodiment of FIG. 11 having a supporter for a shade in a cover of the cover assembly.

The embodiment of FIG. 12 is for use with an incandescent lamp stand. Through an opening 27 provided in the second cover 1b a support means 26 is mounted which supports a lamp shade 25.

Figure 13:
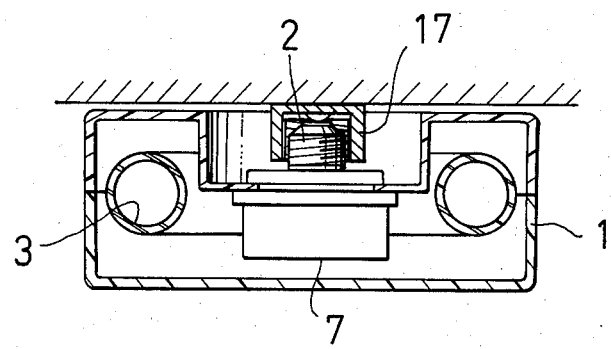
FIG. 13 shows another modification of the embodiment of FIG. 11.

The embodiment of FIG. 13 provides a cover assembly 1 adapted to be used with the receptacle type socket 17 (see FIG. 7).

Figure 14:
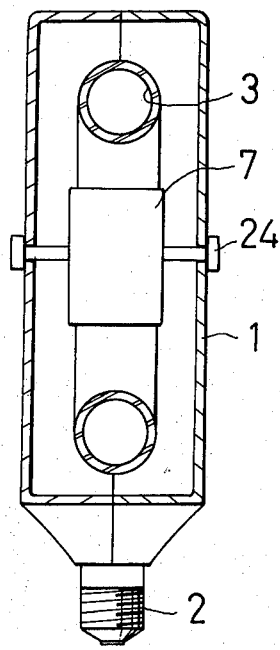
FIG. 14 shows a further modification of the embodiment of FIG. 11 wherein the base if fixed in the periphery of the cover assembly.

In the embodiment of FIG. 14, the base 2 is mounted to one side of the disk-shaped cover assembly 1, so as to be mounted on a wall. This embodiment may be used as an indication lamp.

Figure 15:
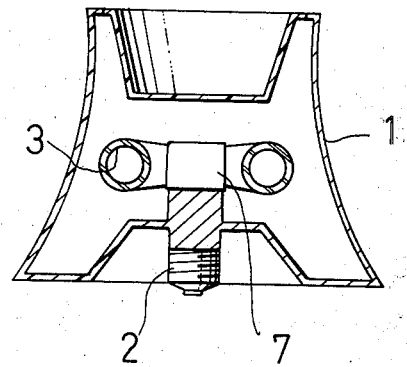
FIG. 15 shows an embodiment of the shade shaped cover assembly.

In the embodiment of FIG. 15, the cover assembly 1 itself is made in the form of a lamp shade of the lamp stand.

Figure 16:
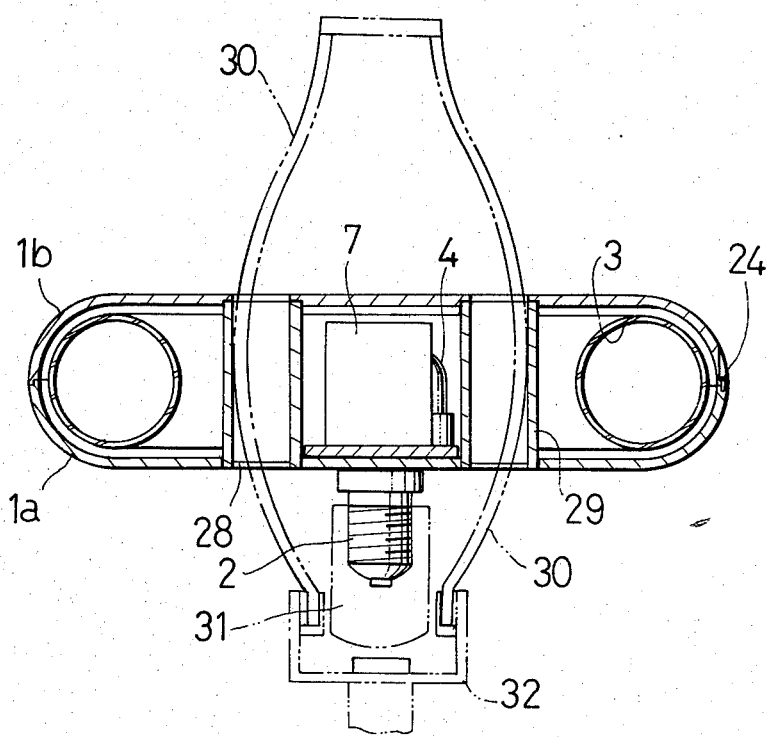
FIG. 16 shows an embodiment of the light fixture having a structure for mounting a harp thereon.

In the embodiment of FIG. 16, through bores 28, 28 are provided in the cover assembly 1 and cylindrical members 29 are inserted along the inner wall of the respective bores 28. In the figure, there is shown by chain lines a part of the conventional incandescent lamp stand structure. The numeral 30 denotes a harp for supporting the lamp shade, which is mounted into a receptacle means 32 through the bores 28 and the cylinders 29 after mounting the base 2 into a stand socket 31. In this embodiment, the base 2 may be made integral with the stabilizer 7 received within the cover assembly 1.

Figure 17:
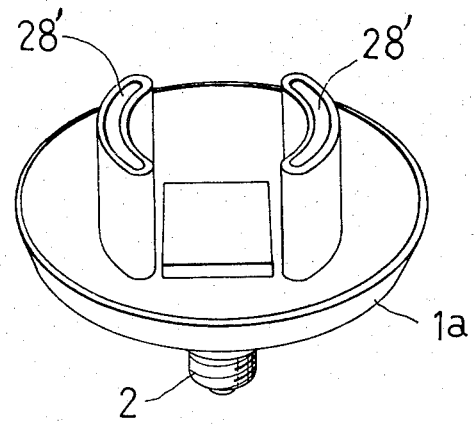
FIG. 17 shows a modification of the structure for the harp of the embodiment of FIG. 16.

In the embodiment of FIG. 17, the shape of the through bores 28 of the embodiment of FIG. 16 is modified so as to give freedom of mounting the harp 30 within the range of the width of the bores 28'. For this purpose, the arc of the bores 28' of FIG. 17 should preferably be about 90–120°.

In the above mentioned embodiments used with the lamp stand as in FIGS. 16 and 17, the fluorescent lamp 3 itself is included within the cover assembly 1. Therefore, when the stand falls down, breakage of the lamp 3 itself may be prevented. Even if the fluorescent lamp 3 is broken, the cover assembly 1 receives pieces of broken glass and mercury of the fluorescent lamp 3.

Figure 18:
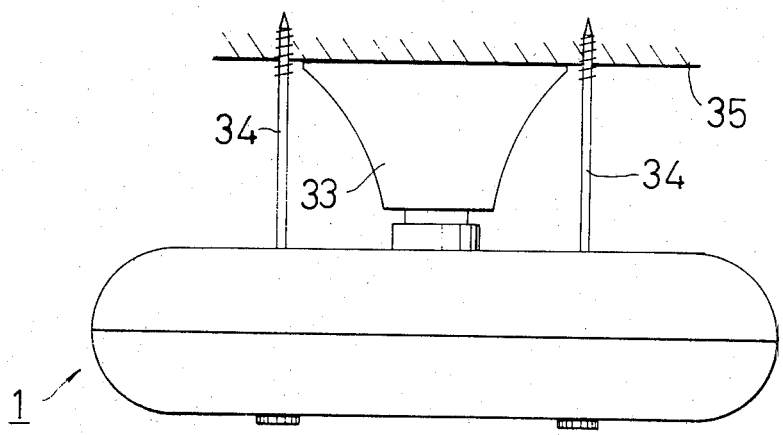
FIG. 18 shows an example of utilizing bores shown in FIGS. 16 and 17 when the light fixture is mounted to the ceiling.

FIG. 18 shows an example of using the bores 28 or 28' of FIGS. 16 and 17 as holes for inserting long attaching screws 34 to the ceiling 35 when the cover assembly 1 is mounted to a socket 33 directly fastened to the ceiling 35. The attaching part is thus mechanically strengthened.

Figure 19:
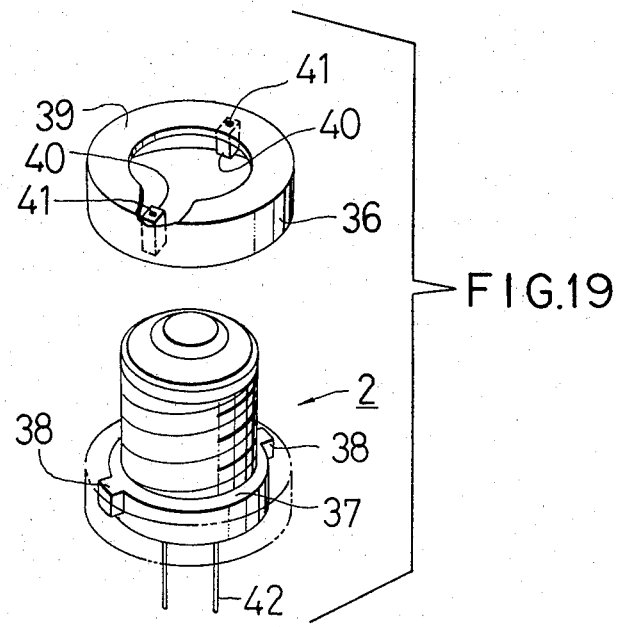
FIG. 19 shows a base structure of the light fixture.
Figure 20:
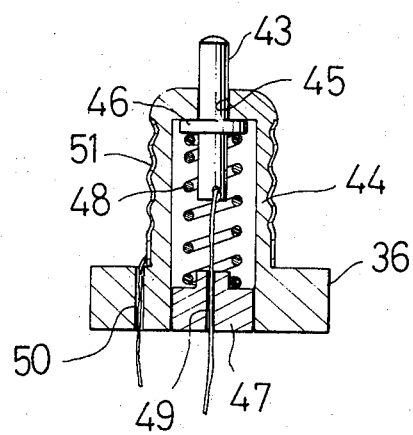
FIG. 20 shows a modification of the base structure of FIG. 19.

FIGS. 19 and 20 shows embodiments of the base mechanism 2. In the embodiment shown in FIG. 19, which is illustrated in exploded form, a flange 37 is provided integrally at the lower part of the base 2. Around the periphery of the flange 37 are provided protrusions 38, 38 at positions symmetrically arranged with respect to each other. A fitting means 36 is made of a cylinder having a flange 39. Protrusions 40, 40 project from an inner wall of the cylinder symmetrically located with respect each other, and the widths of the protrusions 40, 40 are made smaller than that of the flange 39. The inner diameter of the flange 39 of the fitting means 36 is selected to receive the base 2 therethrough but to be stopped at the upper surface of the flange 37. When the fitting means 36 is mounted over the base 2 as shown by chain lines in FIG. 19, the base 2 and the fitting means 36 may rotate freely until the protrusions 38 and 41 strike each other. For attaching the fitting means 36 to the cover assembly, there are provided screw holes 41. The numeral 42 denotes lead-in wires.

In the embodiment of FIG. 19, since the base 2 has freedom of rotation of about a half round with respect to the fitting means 36 which is integrally provided to the cover assembly 1, when the base 2 is fixed to the cover assembly 1, while holding the assembly 1 in hand, at first the base 2 is rotated idly over its free rotation range and by contacting the protrusions 38 and 41 the base 2 is fixed by rotation together with the fitting means 36 or the cover assembly 1. In the embodiment of FIG. 19, the base 2 is of the screw type, but a bayonet type base may be used therefor. According to the conventional structure, when the base 2 is screwed into the socket of the ceiling or wall so that it is connected to the socket mechanically and electrically, the direction of the cover assembly 1 cannot be selected. In this connection with the structure shown in FIG. 19, any direction of mounting the base 2 may be selected freely. Namely, after finishing the fixing of the base with the fitting means 36, the cover assembly 1 may be rotated back in the reverse direction in the free rotation range without loosening the fixed relation. This is advantageous when the shape of the cover assembly 1 is, for example, rectangular. In this connection particular reference should be made to the structure of the embodiment of FIG. 5.

FIG. 20 shows a modification of the embodiment of FIG. 19. In this structure, a member 44 of insulating material, is integrally provided with the fitting means 36 and through an opening 45 provided at the top of the member 44 a central electrode 43 of the base 2 is protruded. To the electrode 43 is mounted by screwing a collar 46 within the member 44. Between the collar 46 and a member 47 of insulating material which is also inserted within the member 44 is provided a compressed spring 48. The spring 48 thus always urges the collar 46 against the inner and lower face of the top of the member 44. At an end of the central electrode 43 inserted within the member 44, a lead-in wire 42 is soldered, which extends through a hole 49 provided in the inserted member 47. Another wire 42 is soldered to an outer electrode 51 through a hole 50 provided in the fitting means 36.

When the base structure of FIG. 20 is put or screwed into the socket, the central electrode 43 is pressed gradually against a central electrode of the socket during the putting operation and finally pushed downwardly into the interior of the member 44 against the force of the spring 48.

By this lowering of the electrode 43 into the interior of the member 44, the mechanical and electrical connection between the base 2 and the socket is already sufficient. The direction of mounting the cover assembly 1 may be selected in the range of movement of the electrode 43. For example, such regulation may be made as follows: At first, the central electrode 43 is lowered to its lowermost limit and is fixed there, and then may be loosened for selecting a desired direction of mounting. Therefore, in such case, the extent of lowering the electrode 43 may be determined within the extent corresponding to a half rotation of the outer electrode 51, or in other words a half pitch or so.

Figure 21:
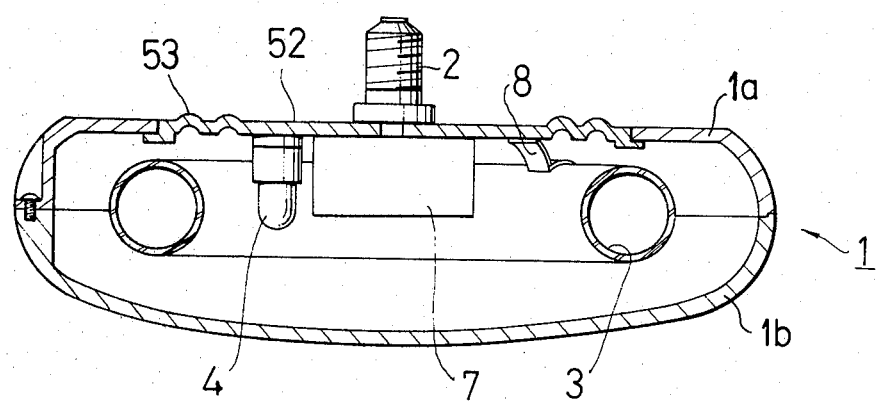
FIG. 21 shows a structure of the light fixture wherein a part of the cover assembly is made of metal.

In the embodiment of FIG. 21, the cover assembly 1, having cover members 1a and 1b, includes a metal plate member 52, and the circular fluorescent lamp 3 and the lighting means including the stabilizer 7 and the initiator bulb 4 are disposed within the cover assembly 1 through the support member 8. The lamp 3 and the lighting means may be mounted directly to the member 52. In this connection, the metal member 52 is fixed to the base 2 but is insulated electrically therefrom. The outer edge of the metal member 52 and edge of the cover assembly 1 are attached to each other. In the metal plate 52 of this embodiment there is provided radiation fins 53.

Figure 22:
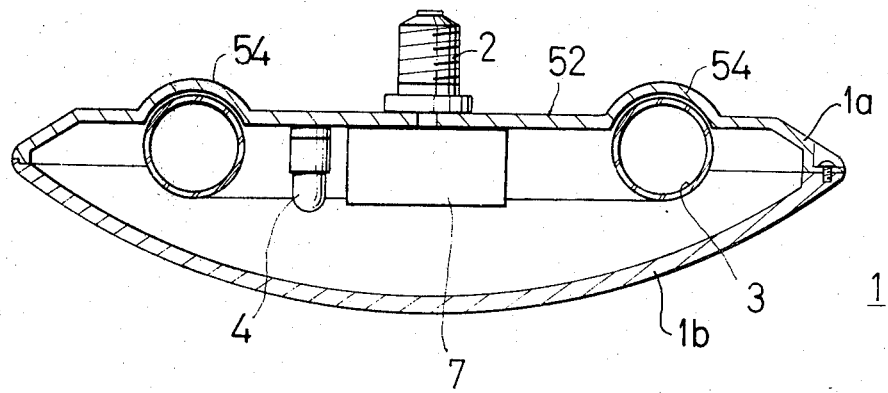
FIG. 22 shows a modification of FIG. 21 wherein a fluorescent tube is directly fixed to the metal cover.

In the embodiment of FIG. 22, a receptacle 54 for receiving a circular fluorescent lamp 3 is provided in the metal plate 52 so that the lamp 3 may be fitted into the inner cavity of the receptacle 54.

Figure 23:
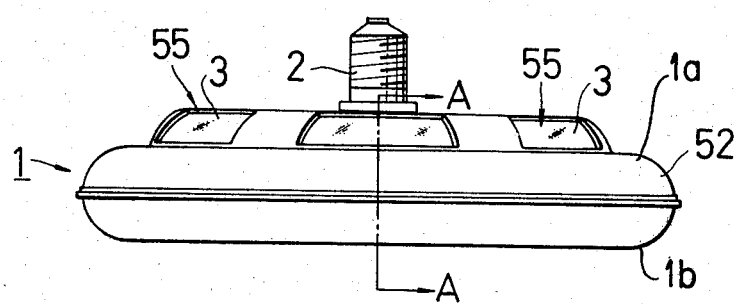
FIG. 23 shows another modification of the embodiment of FIG. 21, wherein windows are provided in an upper cover of the cover assembly.
Figure 24:
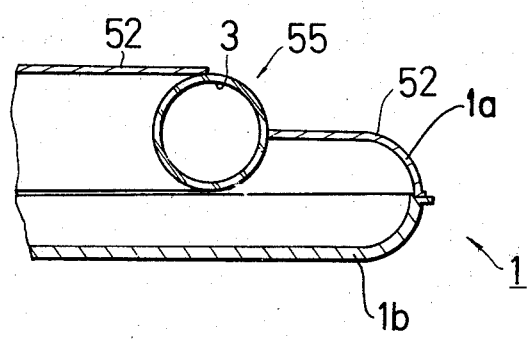
FIG. 24 is an enlarged section of FIG. 23 taken along the line A—A; of FIG. 23.

FIG. 23 shows a modification of the structure of the metal member 52, and FIG. 24 shows an enlarged section of a part thereof. In the receptacle for the lamp 3 windows 55 are provided into which the wall of the lamp 3 is fitted.

Figure 25:
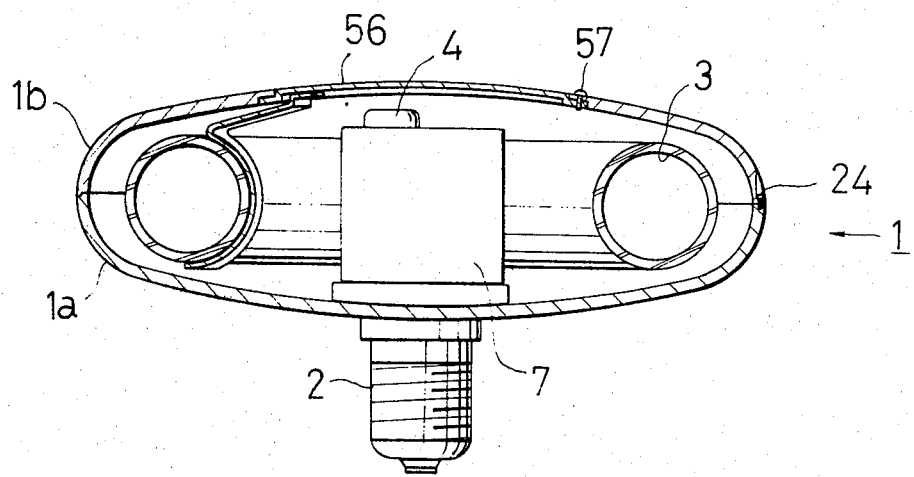
FIG. 25 is an embodiment of the light fixture wherein a part of a cover of the cover assembly is a metal member by which the fluorescent tube is supported.
Figure 26:
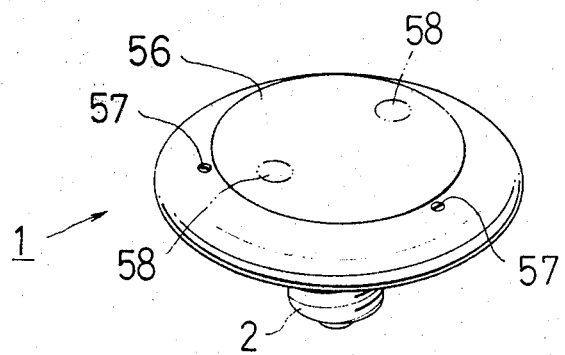
FIG. 26 is a perspective view of the light fixture of FIG. 25.

In the embodiment of FIG. 25, a metal radiator plate 56 is attached to the upper central part of the cover 1b by set screws 57, as shown, or by any other fixing means. To the cover 1a there is provided the base 2. The inner surface of the radiator plate 56 may be made light reflecting, so that it will function as a reflector for the lamp 3 in the cover assembly 1. In order to increase the radiation effect, the metal plate 56 may be provided with a corrugated waveform or radiator fins as shown at 53 of FIG. 21. As shown in FIG. 26, which is a perspective view of the embodiment of FIG. 26, bores 58 may be provided in the metal 56 for inserting a harp therethrough. The bores 58 may be through bores as in the case of the embodiment of FIG. 16.

Figure 27:
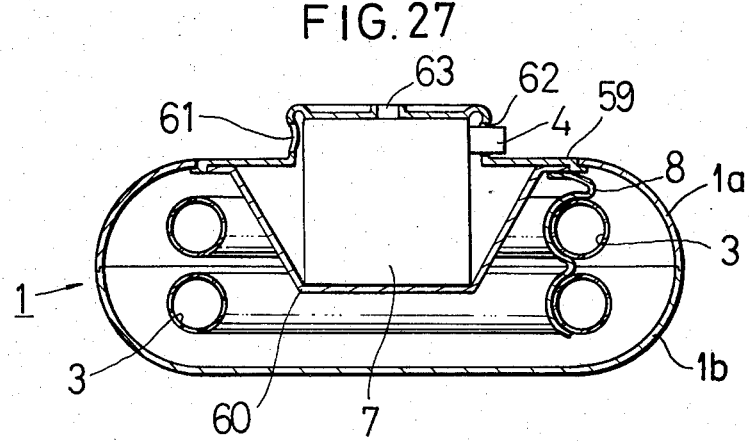
FIG. 27 is an embodiment having a separate space for disposing the stabilizer within the cover assembly.

In the embodiment of FIG. 27, in an upper part of the cover 1 an opening is provided and a metal cover 59 and a partition wall member 60 are mounted thereto. In this embodiment, the two circular fluorescent lamps 3 are provided within the cover assembly 1 around the partition wall member 60 by support member 8. In the space formed between the metal cover 59 and the partition wall member 60, the stabilizer 7 and the initiator bulb 4 are contained. In a part of the metal cover 59 are provided many vent holes 61. An opening 62 for inserting the initiator bulb 4 is also provided in the metal cover 59. In the center of the cover 59 is provided a bore 63 for a cord.

Figure 28:
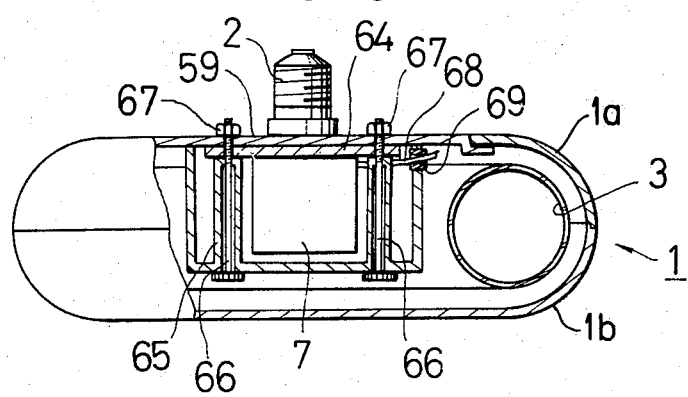
FIG. 28 is a modification of the structure of the light fixture of FIG. 27.

In the embodiment of FIG. 28, the ends of a mounting plate 64 for the stabilizer 7 are held between an inner supporting member 65 of the partition wall member 60 and the inner wall of the cover 59, which part is further pressed by screws 66 and nuts 67 passed through from under the partition wall member 60 to the upper exterior of the cover 59. The base 2 is fixed in the center of the cover 59. The numeral 68 denotes an electricity supplying cord connected with the fluorescent lamp 3 and the numeral 69 identifies an insulated ring for sealing, ring being attached to an opening in the wall 60 for passing the cord 68 therethrough.

In these embodiments the cover assembly 1 and the metal cover 59 are fixed with respect to each other, for example, by set screws but detachable from each other for exchange of a lamp or a cover. Since the opening of the cover assembly 1 for mounting the metal cover 59 is made relatively large, exchange of the fluorescent lamps 3 may be made by merely detaching the cover assembly from the metal cover 59. The shape of the lamp 3 used is not limited to a circular shape, but may be U-shaped or of eggplant shape.

In these embodiments, the stabilizer whose thermal dissipation during lighting is relatively large may be separated from the fluorescent lamp 3 by a partition wall member 60. Thus warming of the stabilizer 7 and the lamp 3 by each other may be prevented. With this structure the cover assembly 1 covering the lamp 3 can be made small and airtight.

Any dust over the cover assembly 1 may be removed by merely wiping with a cloth and the cover can be cleaned easily.

The thermal dissipation of the initiator bulb 4 in operation is not large. Therefore it may be included in the interior of the cover assembly 1.

Figure 29:
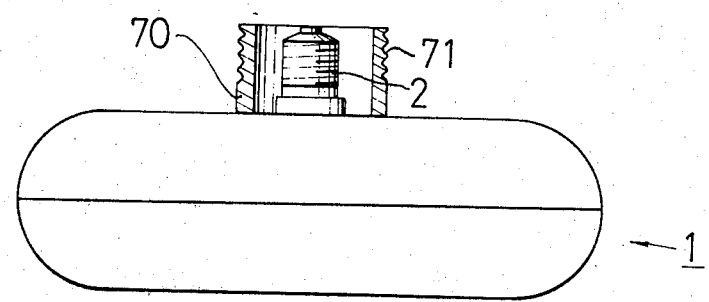
FIGS. 29-34 show fixing auxiliary means other than the base.
Figure 30:
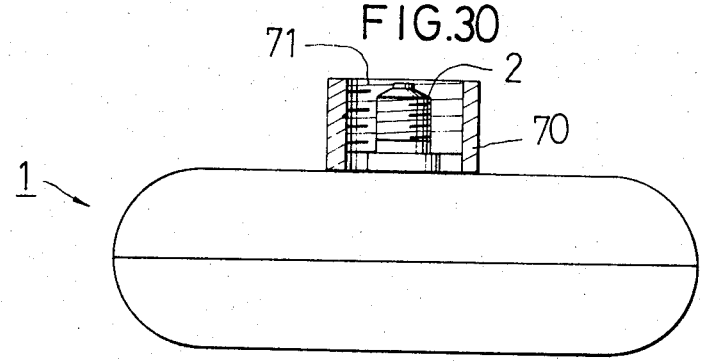
Figure 31:
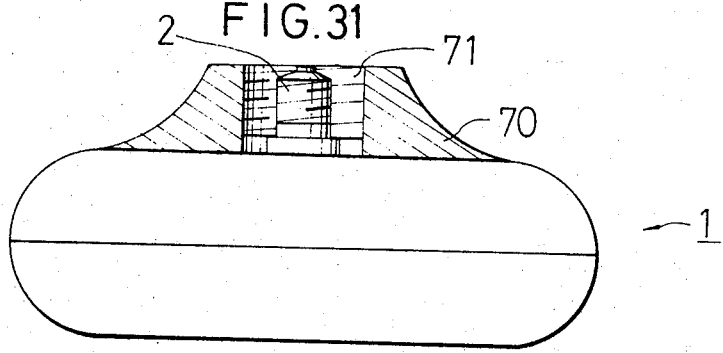

In the embodiment of FIG. 29 a connecting pipe 70 is positioned on the cover assembly 1 around the base member 2. The outer periphery of the connecting pipe 70 has screw threads 71. The screw threads 71 may be formed within the inner wall of the pipe 70 as shown in FIG. 30. In the embodiment of FIG. 31 the pipe 70 is made integral with the cover assembly 1. In this case, the screw threads are formed in the inner wall of the pipe member 70. When a bayonet type base 2 having an engagement pin 72 is used as in the embodiment of FIG. 32, the structure of the pipe 70 may be made as a bayonet type having a similar engagement pin 73. The structure of the pipe 70 and the screw 71 with respect to the base 2 and the cover assembly 1 as shown in FIGS. 30 and 31 may be used in the bayonet type structure.

Figure 33:
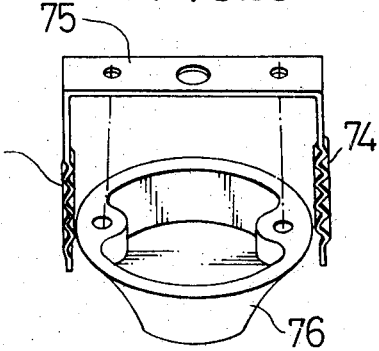
Figure 34:
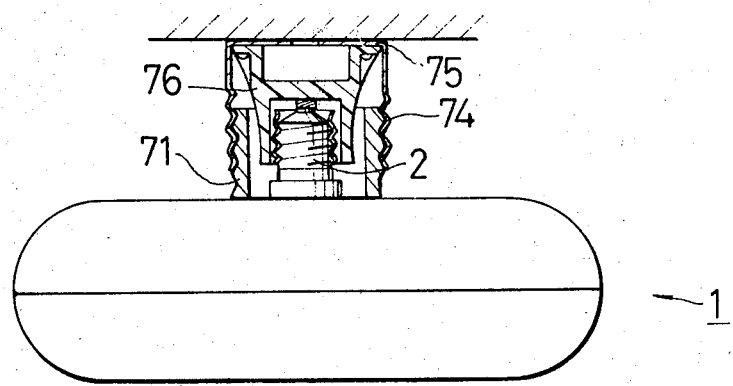

FIG. 33 shows a metal attachment 75 which has a screw part 74 to be engaged with the screw 71 when applied over the support 76. FIG. 34 shows the relation of the support 76, the metal attachment 75 mounted over the base 2 and the pipe 70.

Figure 32:
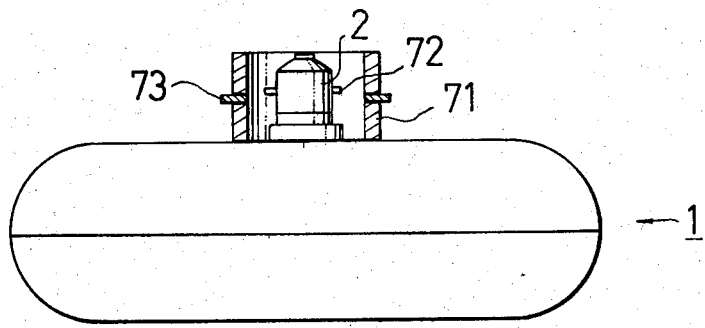

The structure of the screw part 74 may be adapted to be engaged with the engagement pin 73 (of FIG. 32). Also, the metal attachment 75 may be formed integral with the outer periphery of the support 76.

With the structure of FIG. 34, when the base 2 is screwed into the socket 76, the screw part 74 of the attachment 75 is simultaneously screwed over the screw 71. Engagement of the bayonet type base can be made similarly. Thus, the load to the support 76 may be lessened by the attachment 75.

It is difficult to constitute the two connection parts at the base 2 and the connecting pipe 70 so as to receive an even load when mounted to the support and the attachment. Therefore, when a sufficient connection is made between the base 2 and the socket in the support 76, some play often remains in the connection between the attachment and the pipe. Also, the reverse case may often occur. In the case that the connection of screw parts begins between the base 2 and the socket in the support 76, the entire load is borne at first by the base and the socket. If the connection is loosened, the load is now borne by the connection of the pipe 70 and the attachment 75. Thus any detachment of the light source member from the support may be prevented sufficiently with this double connection. In the reverse case, when the connection at the pipe 70 is at first made before the base 2 is connected to the socket, the electrical connection between the base electrode and the electrode of the socket is sufficient because the base electrode is urged by the spring, as explained before with respect to FIG. 20.

When a screw type base is used, it is difficult to make the connection at the two parts simultaneously. In order to solve this problem, the initial engagement of one of the two connection parts, particularly of the pipe part is made somewhat looser. With this structure, when the engagement begins at the other part, the pipe member 70 is pushed into the interior of the attachment 75.

If play is provided in the attachment 75 in the screwing direction with respect to the socket, the attachment 75 may be fixed by rotation in the direction of the play after the base is screwed in.

Figure 35:
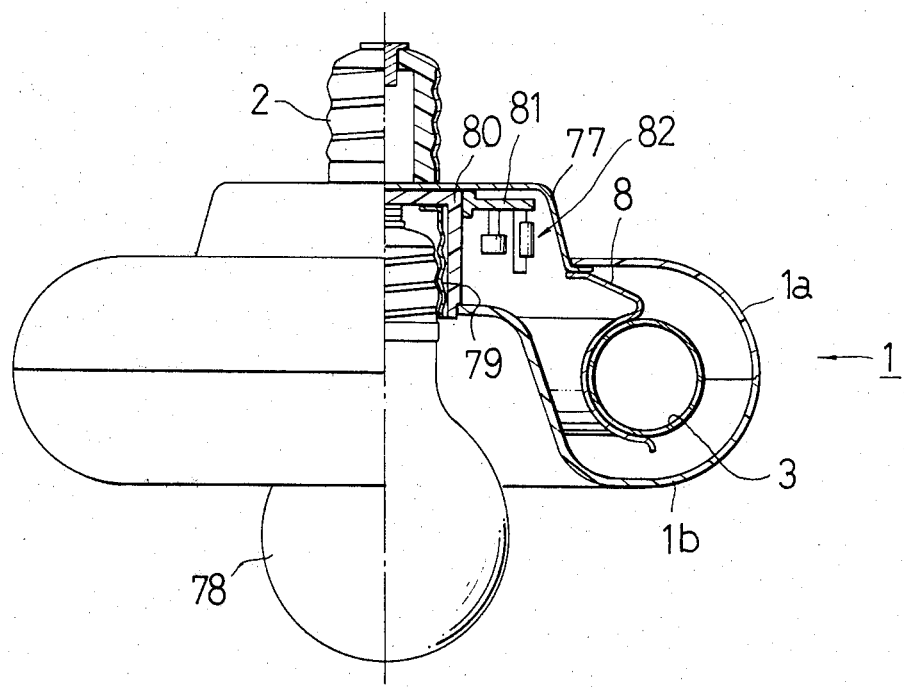
FIG. 35 shows a view, partly broken away, of an embodiment of the light fixture having the initiator bulb within the cover assembly and using a resistor stabilizer of an incandescent lamp mounted to the light fixture.

In the embodiment of FIG. 35, the radiator plate 77 of metal material is fixed in a center part of one of the two covers, 1a, while a cavity is provided in the inside of the other cover 1b into which an opening of a pipe member 80 having a socket metal fitting 79 is provided. The body itself of the pipe member 80 is mounted to an inner wall of the radiator plate 77, and the radiator plate 77 is supported by the base member 2 protruded from its outer or upper surface and by the pipe member 80.

Within the space provided between the covers 1a and 1b of the cover assembly 1 a circular fluorescent lamp 3 is placed by the support member 8. To the outer periphery of the pipe member 80 within the space in the cover assembly 1 is fixed a distribution board 81 on which lighting auxiliary circuit elements 82, 82 are mounted.

In the light fixture of this embodiment a known electric circuit is included which supplies electricity for pre-warming, from the base 2 to the incandescent lamp 78 through the circuit elements 82, 82 and through the socket metal fitting 79, and further to the electrodes of the fluorescent lamp 3.

Figure 36:
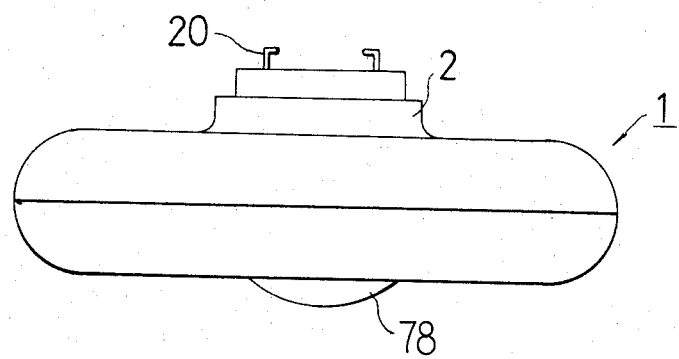
FIG. 36 is a modification of the light fixture of FIG. 35.

In the embodiment of FIG. 36 the hook member 20 for the hook sealing structure is used as a receiving end in place of the base member 2. Any other structure may be used as the receiving element of electricity.

In these embodiments, only the lamp 3 and the lighting circuit elements 82, 82, both of whose thermal dissipation are not large, are included in the cover assembly 1. The volume of the cover assembly 1 may be made relatively small compared with the size of a conventional shade, etc. Also, since the lighting auxiliary circuit and its circuit elements 82, 82 are disposed within a space remained in the cover assembly 1 around the outer wall of the pipe member 80, which receives an incandescent lamp 3 thereinto, sufficient components necessary for lighting the fluorescent lamp 3 may be provided in the smaller sized structure. The entire structure of the embodiments of the cover assembly 1 and the incandescent lamp 78 provided in the cavity in the circular-shaped lamp 3 gives an impression of a single body as a whole. Thus the embodiments may be used like an ordinary incandescent lamp having a cover or globe thereover.

In these embodiments a transformer is dispensed with and so the fixture itself is made lighter. Any slippage of the light fixture from the socket may advantageously be prevented with this light construction. The mixing illumination effect of the fluorescent lamp and the incandescent lamp can be enjoyed.

Figure 37:
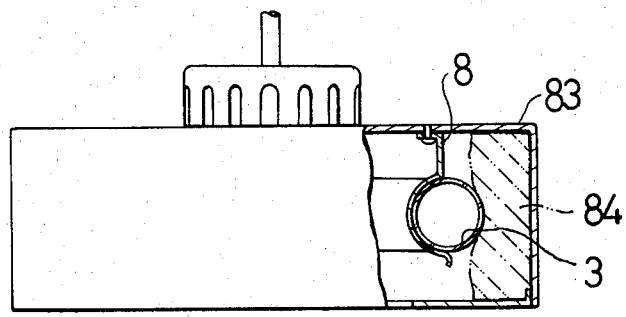
FIG. 37 shows a conventional damping material provided within the cover assembly for transportation.

In the structure of FIG. 37, which shows a presently marketed fluorescent lamp structure, the circular fluorescent lamp 3 is supported by a cantilever support means 8 hanged from a roof 83 of the cover assembly 1.

In order to prevent slippage of lamp 3 from the support means 8 during the transportation of the light fixture, a damping means 84 of urethane foam is stuffed between the circular lamp 3 and the inner wall of the fixture. Before mounting the light fixture, the user must first remove the stuffed damping means 84. If the user forgets this, the damping means 84 might be melted by the thermal dissipation at the time of lighting, which might cause an accident.

Figure 38:
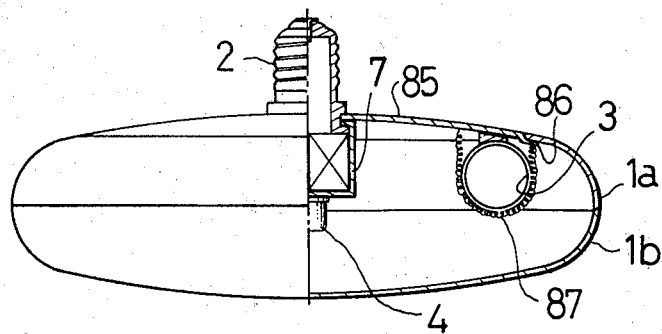
FIG. 38 shows a spring support means to be used according to the present invention in place of the damping means of FIG. 37.

The embodiment of FIG. 38 provides a support means for the fluorescent lamp 3 in order to dispense with the conventional packing means and also overcoming the problem of the undesirable heating.

Figure 39:
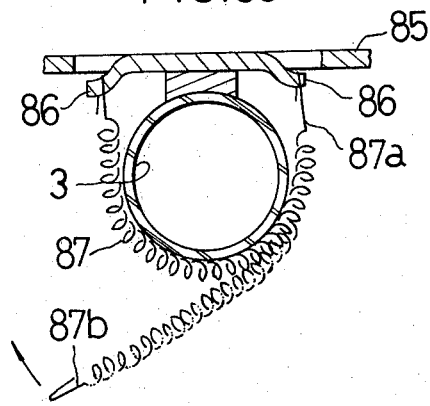
FIG. 39 is an enlarged view of a part of FIG. 38.

As in the already mentioned embodiments, the cover assembly 1 consists of the first and second covers 1a and 1b both being fixed with each other with a set screw. In a center part of the cover 1a, in this embodiment is fixed a metal radiator plate 85. The base 2 is protruded in the plate 85, as in the already mentioned embodiments. As shown in detail in FIG. 39, at several places in the periphery of the cover assembly 1 corresponding to the lamp mounting circle a pair of brackets 86, 86 are integrally provided by molding to the under surface of the plate 85. The numeral 87 shows a coil spring at both ends thereof being provided with hooks 87a and 87b which are hooked to the brackets 86 of the cover assembly 1. In mounting the coil spring 87 to the hook brackets 86, the coil spring 87 surrounds the outer periphery of the fluorescent lamp 3 so that the elasticity of the coil spring 87 presses the lamp 3 against the cover assembly 1.

The brackets 86, 86 need not be integral with the cover assembly 1, but may be fixed to the metal plate 85 or to a part of the cover assembly 1 by a set screw or screws. In place of the coil spring 87, a means partially of a spring or any other elastic material may be used.

The invention has been described in detail with reference to the preferred embodiments thereof, but it should be understood that variations and modifications can be effected within the spirit and scope of the invention.

What is claimed is:

1. A fluorescent light fixture comprising:
   a base for insertion into an incandescent lamp socket having electricity supplied thereto;
   a cover assembly attached to said base including
      a metal plate member for radiating heat from said fixture,
      a first cover member attached to said metal plate member, and
      a second cover member detachably connected to said first cover member, said metal plate and first and second cover members defining a sealed spaced within said cover assembly, a portion of at least one of said cover members being composed of a light transmitting material;
   a hot cathode low pressure mercury vapor fluorescent discharge lamp provided with electrical connecting means;
   a support member attached to said metal plate member for removably supporting said fluorescent discharge lamp within the space defined by said cover assembly; and
   electric circuit means including lighting auxiliary means for coupling the base attached to said cover assembly to the fluorescent discharge lamp connecting means.

2. A fluorescent light fixture according to claim 1, wherein the lighting auxiliary means coupling the base and the fluorescent lamp is an initiator circuit, and a stabilizer is provided exterior of the cover assembly.

3. A fluorescent light fixture according to claim 2, wherein the initiator circuit is an initiator bulb and wherein the stabilizer is a transformer provided adjacent the incandescent lamp socket side into which the base is inserted.

4. A fluorescent light fixture according to claim 3, wherein the initiator bulb is mounted on a socket assembly, said socket assembly having means for connecting the connecting means of said fluorescent lamp to said base.

5. A fluorescent light fixture according to claim 3, wherein said base has a longitudinal axis and said fluorescent lamp is of a circular shape defining a plane, said lamp being mounted so that said plane is parallel to the axis of said base.

6. A fluorescent light fixture according to claim 5, wherein said cover assembly has a reentrant part and letters and patterns are provided on a surface of the reentrant part.

7. A fluorescent light fixture according to claim 3, wherein the transformer is disposed in an adapter having an independent base and socket, the base of the adapter being fitted into the incandescent lamp socket and the socket of the adapter receiving the base of the cover assembly.

8. A fluorescent light fixture according to claim 2, wherein said stabilizer comprises an incandescent lamp said lamp being located in a socket in the cover assembly and protruding outwardly from the cover assembly, said initiator circuit being included within the cover assembly.

9. A fluorescent light fixture according to claim 1, wherein the lighting auxiliary means which connects the base attached to the cover assembly with the connecting means of the fluorescent lamp includes an initiator bulb and a stabilizing transformer, said transformer being supported in the center of the cover assembly.

10. A fluorescent light fixture according to claim 9, wherein said base has a longitudinal axis, a plane defining the boundary between the first and second cover members of said cover assembly being perpendicular to the longitudinal axis of said base, said transformer and said fluorescent lamp being supported by at least one of said first and second cover members.

11. A fluorescent light fixture according to claim 10, wherein said base is attached to one of said cover members and a support is provided within the other cover member for supporting a shade.

12. A fluorescent light fixture according to claim 10, wherein said base is attached to a cover member having a reentrant form, said reentrant cover member surrounding said socket when said base is inserted therein.

13. A fluorescent light fixture according to claim 10 wherein the cover assembly has the form of a shade.

14. A fluorescent light fixture according to claim 10, wherein a space is provided within said cover assembly for mounting the transformer.

15. A fluorescent light fixture according to claim 9, wherein a rotative connection structure is provided around the outer periphery of the base, said rotative connection structure contacting a corresponding connection structure provided in the socket when the base is fitted into the socket.

16. A fluorescent light fixture according to claim 1, wherein a plurality of openings are provided in the metal plate member.

17. A fluorescent light fixture according to claim 1, wherein the base is adapted to rotate within a limited angular range with respect to the cover assembly, the base being fitted into the socket by a fitting means mounted over the base, the position of the cover assembly being movable within said limited angular range when said base is fitted by said fitting means into said socket.

18. A fluorescent light fixture according to claim 1, wherein said fluorescent lamp is circular and is supported by coil springs hooked to brackets provided at a plurality of locations on one of the cover members.

* * * * *